United States Patent [19]

Palmer

[11] Patent Number: 4,470,256

[45] Date of Patent: Sep. 11, 1984

[54] FLUID COMPRESSOR

[75] Inventor: Donald L. Palmer, Cave Creek, Ariz.

[73] Assignee: The Garrett Corporation, Los Angeles, Calif.

[21] Appl. No.: 333,500

[22] Filed: Dec. 22, 1981

[51] Int. Cl.³ ........................................ F02C 9/00

[52] U.S. Cl. ........................ 60/39.29; 415/49; 415/150; 415/157; 415/159

[58] Field of Search ..................... 60/39.27, 39.29; 415/150, 157, 159, 148, 155, 26, 49

[56] References Cited

U.S. PATENT DOCUMENTS

| | | | |
|---|---|---|---|
| 2,739,782 | 3/1956 | White | 415/157 X |
| 2,814,431 | 11/1957 | Darrow et al. | 415/26 |
| 3,318,574 | 5/1967 | Tyler | 415/148 X |
| 3,449,914 | 6/1969 | Brown | 415/150 X |

FOREIGN PATENT DOCUMENTS

| | | | |
|---|---|---|---|
| 2442896 | 3/1976 | Fed. Rep. of Germany | 415/150 |
| 1142112 | 9/1957 | France | 415/159 |
| 0122907 | 10/1978 | Japan | 415/148 |
| 0009622 | 1/1981 | Japan | 415/49 |

*Primary Examiner*—Louis J. Casaregola
*Assistant Examiner*—Donald E. Stout
*Attorney, Agent, or Firm*—Terry L. Miller; Albert J. Miller

[57] ABSTRACT

A fluid compressor including a rotating impeller and apparatus inhibiting fluid surging. The surge inhibiting apparatus includes a multitude of guide vanes circumscribing an inlet of the compressor. Movement of the guide vanes with respect to fluid flowing to the compressor is effective to inhibit fluid surging. A combustion turbine including such a fluid compressor, and a vehicle powered by such an engine are also disclosed.

17 Claims, 7 Drawing Figures

FIG. 1
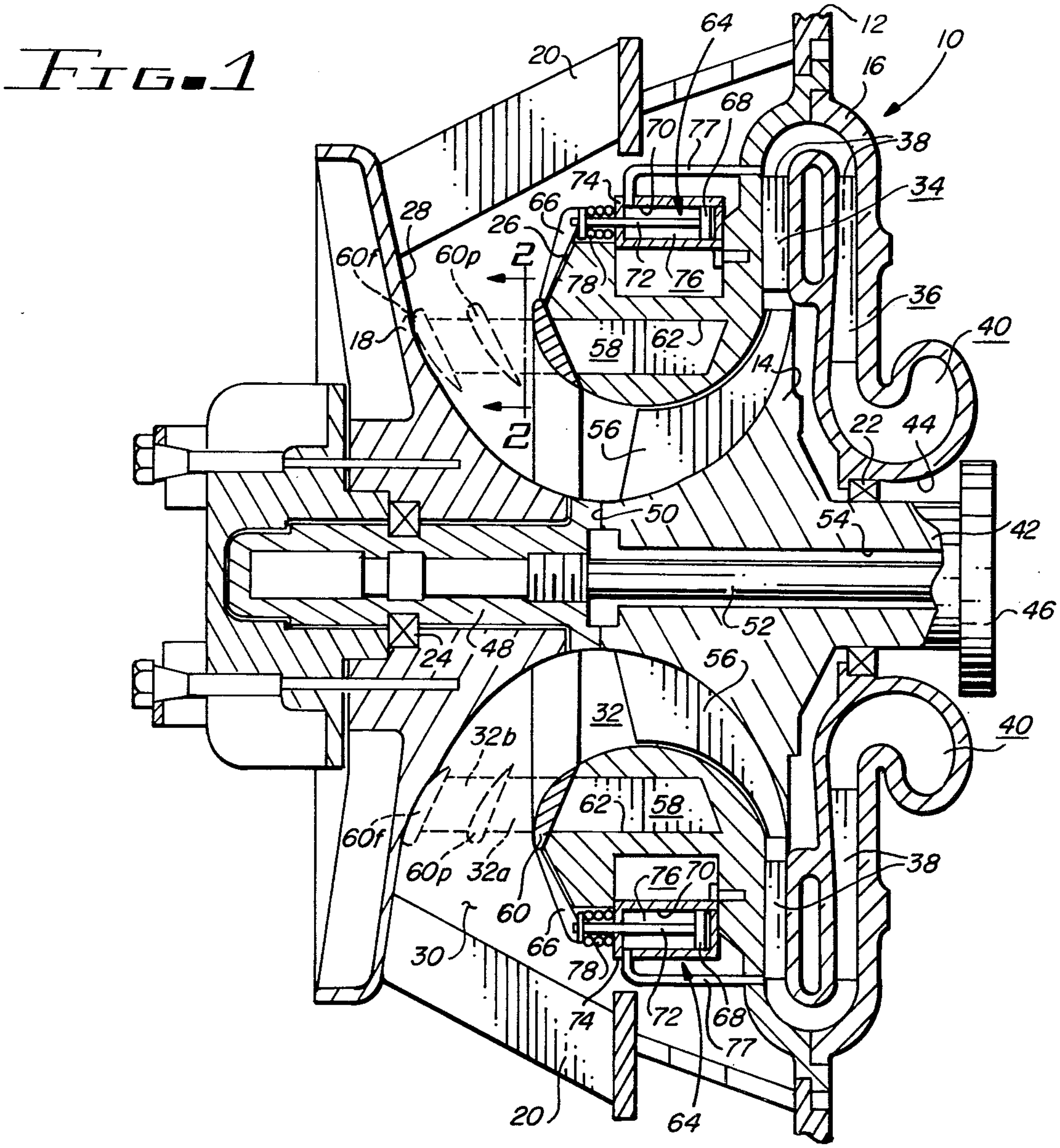
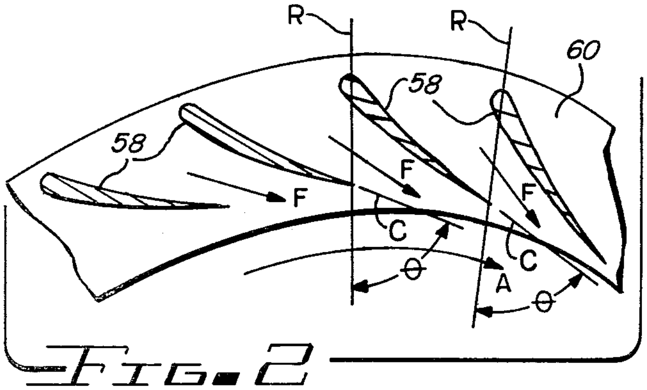
FIG. 2
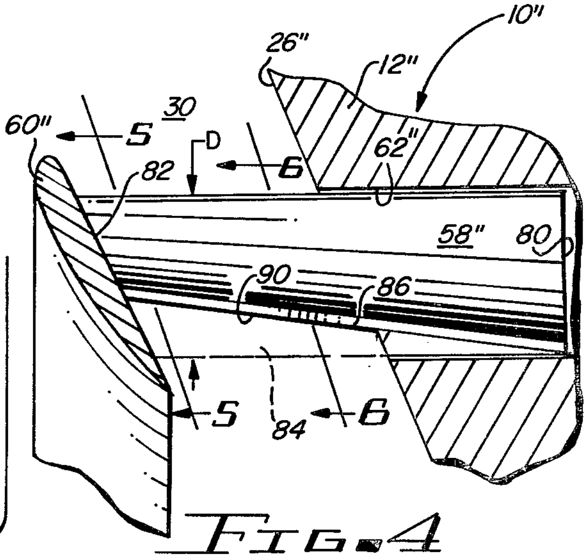
FIG. 4

FIG. 3
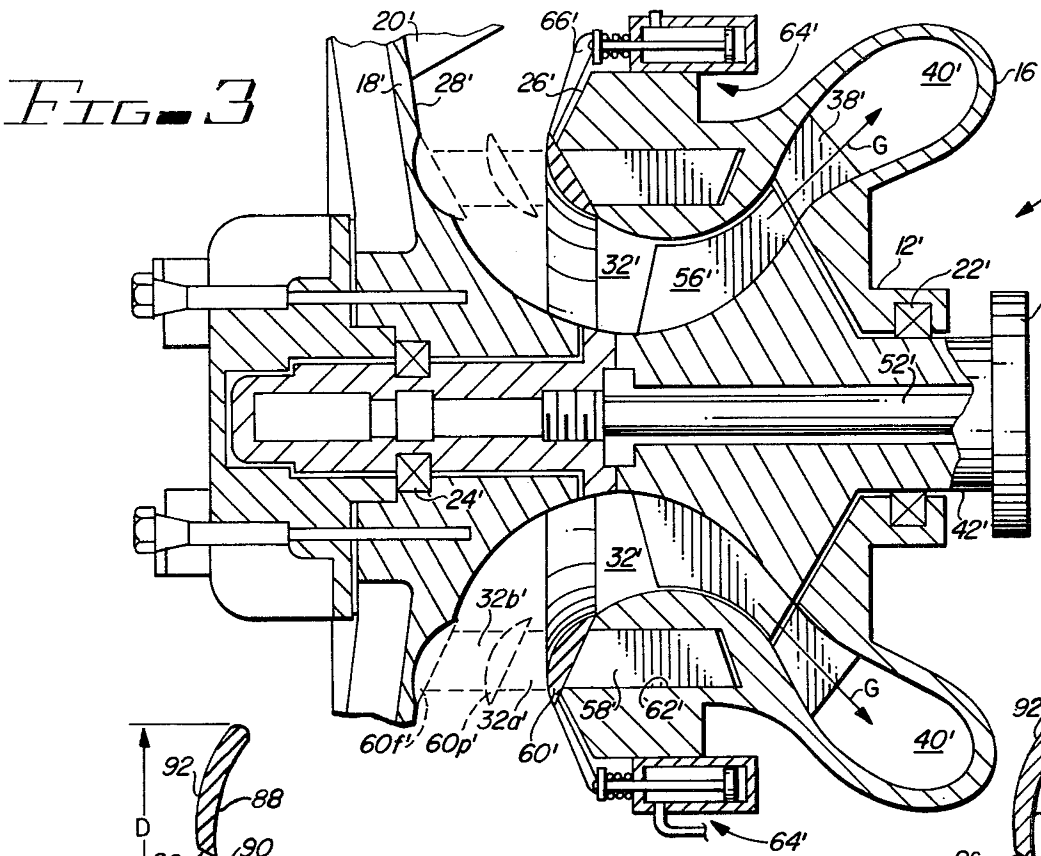
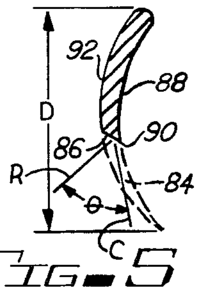
FIG. 5
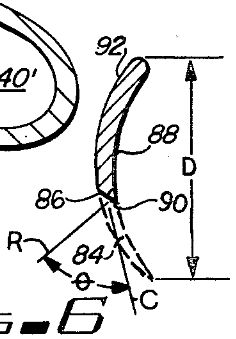
FIG. 6
FIG. 7
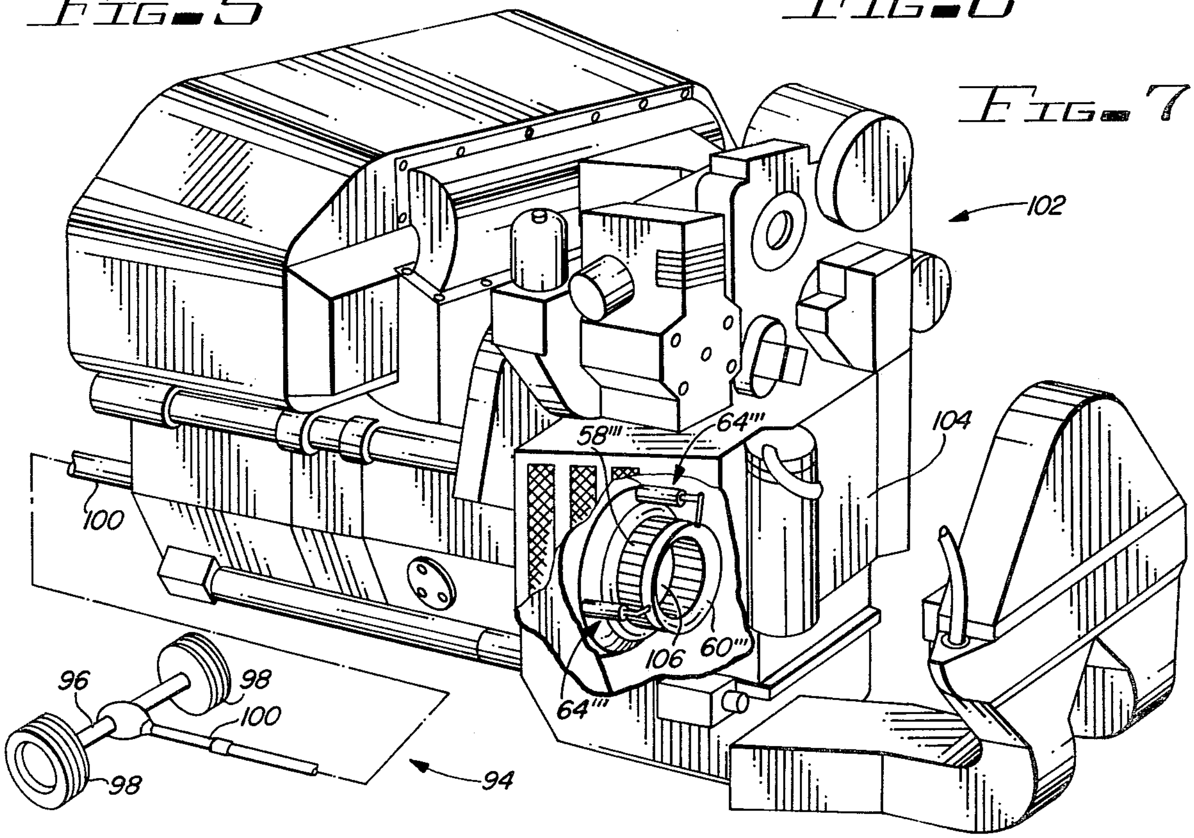

FLUID COMPRESSOR

BACKGROUND OF THE INVENTION

This invention relates to a fluid compressor. More particularly, this invention relates to a fluid compressor either of the radial-flow centrifugal type or of the radial/axial, mixed-flow type having novel apparatus for inhibiting surging of fluid flowing in the compressor. The surge inhibiting apparatus is also effective to selectively vary both the fluid mass flow rate through the compressor and the pressure ratio which the compressor develops. Combustion turbine engines frequently include compressors of the two above-mentioned types to compress atmospheric air to sustain combustion powering the engine. Consequently, this invention also relates to combustion turbine engines.

A conventional method of inhibiting compressor surging is to permanently dispose a multitude of radially extending, variable-angle guide vanes in the inlet of a compressor. When the guide vanes are set to a zero angle of incidence fluid flowing in the inlet passes axially to the impeller. By collectively varying the angle of incidence of the guide vanes from zero to a determined angle a tangential velocity (swirl) is imparted to the flowing fluid. In comparison with axially flowing fluid, the swirling fluid decreases the angle of attack of the blades of the impeller. Because the angle of attack of the impeller blades is decreased, fluid surging is suppressed and the fluid mass flow rate and pressure ratio are decreased. U.S. Pat. No. 2,339,150, granted Jan. 11, 1944 to C. F. Codrington illustrates a blower control system having a multitude of variable-angle guide vanes.

Fluid compressors having variable-angle guide vanes have a number of recognized deficiencies. For example, because the guide vanes are always present in and obstruct the inlet all of the fluid flow through the compressor must pass between the guide vanes. Consequently, the guide vanes cause a pressure drop upstream of the impeller even when they are set to a zero angle of incidence. This undesirable pressure drop decreases the pressure ratio across the compressor. As a result, a larger impeller is required to accomplish the desired pressure ratio. Additionally, the actuating mechanism for the multitude of variable angle guide vanes is complex and expensive to manufacture.

Another conventional method of inhibiting compressor surging is to selectively recirculate a portion of the compressor discharge fluid back to the compressor inlet. The recirculated fluid is introduced tangentially into the inlet to impart a tangential velocity to the fluid flowing to the impeller. U.S. Pat. No. 2,660,366, granted Nov. 24, 1953 to H. Klein, et al., illustrates a compressor surge inhibitor recirculating a portion of the compressor discharge fluid.

As with compressors having variable-angle guide vanes, compressors recirculating a portion of the discharge fluid also have a number of recognized deficiencies. Among these recognized deficiencies is the reduction in compressor efficiency caused by recirculation of compressor discharge fluid. Additionally, the recirculated discharge fluid is warm because of compression so that it increases the temperature of the fluid flowing to the impeller; further decreasing compressor efficiency.

SUMMARY OF THE INVENTION

In view of the above-mentioned recognized deficiencies of conventional fluid compressors, it is an object for this invention to selectively provide swirling fluid flow to the impeller of a compressor without permanently obstructing the compressor inlet or recirculating compressor discharge fluid to the inlet.

Another object for this invention is to provide in a compressor inlet the effect of variable-angle guide vanes by using fixed-angle guide vanes.

Still another object is to provide apparatus for selectively providing swirling fluid flow to the impeller of a compressor wherein the actuating mechanism controlling the apparatus is relatively simple and inexpensive to manufacture.

Yet another object is to provide swirling fluid flow to a compressor impeller without increasing the temperature of the fluid.

In summary, a preferred embodiment of the invention provides a fluid compressor including a housing defining an inlet and journaling an impeller therewithin. A multitude of fixed-angle guide vanes are movable into and out of the inlet to selectively swirl the fluid flowing therein.

An advantage of the invention is that the guide vanes are movable into the inlet when suppression of surging is required. The guide vanes are also movable out of the inlet when surging control is not required and when an unobstructed inlet and high mass flow rate are desired. When the guide vanes are removed from the inlet they do not cause a pressure drop upstream of the impeller. Conversely, when a reduction of mass flow rate is desired, the guide vanes are movable into the inlet to effect the reduction substantially independently of impeller speed. A further effect of reducing the mass flow rate by extending the guide vanes into the inlet is to reduce the power requirement of the impeller. Thus, the rotational speed of the impeller may be maintained at a selected level with the fluid flow rate, pressure ratio, and driving power requirement of the impeller varying with the position of the guide vanes.

A further advantage is that the guide vanes have a fixed angle of incidence and translate in and out of the inlet as a group. As a result, a relatively simple and inexpensive actuating mechanism is sufficient to control the vanes. The guide vanes do not increase the temperature of the fluid flowing to the impeller so the efficiency of the compressor remains relatively high even when the guide vanes are extending into the inlet.

Moreover, a tangential velocity (swirl) may be imparted only to a portion of the fluid flow while allowing the remainder of the flow to pass axially to the impeller. In other words, according to a preferred embodiment of this invention the inlet guide vanes may be extended only partially into the inlet. Because the guide vanes extend into the inlet from one wall thereof and toward the opposite wall, the effect of the guide vanes is variable and increases as the guide vanes extend farther into the inlet.

During start-up of a fluid compressor and during transient conditions of operation, the radially outer or tip part of the impeller blades is believed to first reach surging flow conditions. According to a preferred embodiment of the invention, the inlet guide vanes are extendable from that wall of the inlet which leads to the impeller blade tips. Consequently, when surging fluid flow is imminent the guide vanes are extendable into the inlet to swirl only a portion of the fluid flow. The swirling portion of the fluid impinges upon the blade tips to suppress surging. By extending or retracting the guide vanes a greater or lesser portion of the fluid flow may be swirled to suppress surging while allowing the remainder of the flow to pass unimpeded to the impeller.

A further aspect of this invention resides in its application to a combustion turbine engine and particularly to a free-turbine engine for a ground vehicle. In order to accomplish the start-and-stop operation of a ground vehicle, for example, of a truck, it is desirable to rapidly increase and decrease the power output of the vehicle engine. Such variations in engine power output, if accompanied by large variations in engine speed, impose undesirable stresses on a turbine engine. Further, the power increases relatively slowly because the rotational inertia of the engine must be overcome. However, the power output of a turbine engine may be varied by varying the mass flow rate through the engine while maintaining engine speed relatively unchanged. To this end, a preferred embodiment of this invention provides a free turbine engine with a compressor having guide vanes moving into and out of the compressor inlet. The guide vanes, when extending into the inlet, reduce the mass flow rate through the engine to reduce the power output of the engine. Additionally, the guide vanes reduce the power requirement of the compressor impeller. As a result, the speed of the impeller may be maintained at a high level during reduced-power operation of the engine. When an increase of engine power is desired, the mass flow rate through the engine and its power output may be increased by retracting the guide vanes out of the inlet. Because the speed of the impeller has been maintained at a high level, the engine power output increases rapidly without having to overcome the rotational inertia of the engine.

Further objects and advantages of this invention will appear in light of the following detailed description of four preferred embodiments thereof.

BRIEF DESCRIPTION OF THE DRAWINGS

FIG. 1 is a fragmentary, axial, cross-sectional view of a radial-flow centrifugal compressor according to the invention;

FIG. 2 is a fragmentary cross-sectional view taken along line 2—2 of FIG. 1;

FIG. 3 is a view similar to FIG. 1 and illustrating an axial/radial, mixed-flow type of compressor embodying the invention;

FIG. 4 is a fragmentary view, partly in cross section, of an alternative embodiment of the invention;

FIGS. 5 and 6 are cross-sectional views taken respectively along lines 5—5 and 6—6 of FIG. 4; and FIG. 7 is a diagrammatic view of an automotive vehicle having a combustion turbine engine embodying the invention with parts of the engine broken away or removed for clarity of illustration.

DETAILED DESCRIPTION OF THE PREFERRED EMBODIMENTS

Viewing FIG. 1, a radial-flow centrifugal compressor 10 includes a housing 12 journaling a rotor or impeller 14 therein. The housing 12 includes a first portion 16 and a second portion 18 which are interconnected by a multitude of struts 20 (only two of which are visible in FIG. 1). The first and second housing portions 16 and 18 respectively carry bearings 22 and 24 journaling the rotor 14. The housing portions 16 and 18 also define a pair of spaced apart walls 26 and 28 cooperating to define an annular inlet 30. A flow path 32 extending through the housing 12 communicates the inlet 30 with the rotor 14. Downstream of the rotor 14, the flow path 32 includes an annular, radially outwardly extending diffuser section 34 which is defined within the housing portion 16. Diffuser section 34 leads to a radially inwardly extending annular diffuser section 36. Within the diffuser sections 34 and 36, the housing portion 16 defines a multitude of radially extending diffuser guide vanes 38. The diffuser section 36 leads to an annular outlet chamber 40 from which the flow path 32 communicates externally of the housing 12.

In order to rotatably drive the rotor 14, the latter includes a shaft portion 42 extending axially through an aperture 44 defined by the housing 12. The shaft 42 carries a drive flange 46 connectable to a source of mechanical energy (not shown). The rotor 14 includes a stub shaft section 48 which is connected to the remainder of the rotor 14 at a joint 50. A tie bolt 52 extends through a central bore 54 defined by the rotor 14 and threadably engages the stub shaft section 48 to secure the stub shaft to the remainder of the rotor.

The rotor 14 includes a multitude of axially and radially extending impeller blades 56 (only two of which are visible in FIG. 1). When the rotor 14 is rotatably driven via the shaft 42, fluid is inducted through the inlet 30, moved along the flow path 32 while increasing in pressure, and discharged to the outlet chamber 40. From the outlet chamber 40 the fluid communicates to a point of use, for example to an engine.

The housing 12 movably carries a multitude of annularly arranged inlet guide vanes 58 (only two of which are visible in FIG. 1). The inlet guide vanes 58 are secured to and move in unison with an annular inlet shroud 60. Each one of a multitude of annularly arranged slots or recesses 62 (only two of which are visible in FIG. 1) defined by the housing 12 slidably receives a respective one of the inlet guide vanes 58. The inlet guide vanes 58 and inlet shroud 60 are axially movable between a retracted position, illustrated by solid lines in FIG. 1, and a fully extended position, which is illustrated in FIG. 1 by dashed lines at 60*f*. In the retracted position of the inlet guide vanes, the inlet shroud 60 engages the wall 26 of the housing 12 so that the leftward surface of the inlet shroud 60 bounds the flow path 32, viewing FIG. 1. In the fully extended position, the inlet shroud is engageable with the wall 28 so that the rightward surface of the shroud 60 bounds the flow path 32. Inlet shroud 60 is movable to a partially extended position (illustrated by dashed lines at 60*p*, viewing FIG. 1), wherein the shroud 60 is spaced from the housing 12. In the partially extended position, the inlet shroud 60 divides the flow path 32 into a first portion 32*a* and a second portion 32*b*.

FIG. 2 illustrates that the guide vanes 58 have an airfoil shape in cross section. Each of the guide vanes 58 has a fixed angle of incidence with respect to the housing 12. In other words, the guide vanes 58 are not pivotal with respect to a span-wise extending axis as is conventional. Further, with respect to radial reference lines R radiating from the axis of rotation of rotor 14, the trailing edge line C of each inlet guide vane 58 defines an equal incidence angle $\theta$. While the angle $\theta$ may vary depending upon various design parameters of a fluid compressor, the applicant believes that in a preferred embodiment of the invention an angle $\theta$ of about 60° is optimum.

Because of the inlet guide vanes, fluid inducted by the rotor 14 through the portion 32*a* of flow path 32 possesses a tangential velocity or swirl (illustrated by arrows F) with respect to the axis of rotation of rotor 14. Consequently, the swirling fluid flowing to the impeller blades 56 of rotor 14 meets the blades with a different relative velocity and angle of incidence than fluid without swirl. For example, if the rotor 14 rotates clockwise viewing FIG. 2 (indicated by arrow A) then the swirling fluid F has a reduced relative velocity and angle of incidence upon the blades 56.

In order to axially move the guide vanes 58 and inlet shroud 60 to selectively swirl fluid flowing to the rotor 14, a pneumatic actuator 64 is drivingly connected to the shroud 60 via a lever 66. The lever 66 is carried by and moves in unison with the shroud 60. Actuator 64 includes a piston 68 slidably and sealingly received within a cylinder 70 carried by the housing 12. A piston rod 72 slidably and sealingly extends through an annular and wall 74 of the cylinder 70. The piston rod 72 is drivingly coupled with the lever 66. The piston 68, cylinder 70 and piston rod 72 cooperate to define a chamber 76. A conduit 77 communicates pressurized fluid from the flow path 32 downstream of the rotor 14 with the chamber 76. A coil compression spring 78 extends between the end wall 74 and the lever 66 to yieldably bias the shroud 60 and guide vanes 58 toward an extended position.

Having observed the structure of the compressor 10, attention may now be given to its operation. During start-up of the compressor 10, as the rotational speed of the rotor 14 is increased toward a normal operating speed, the mass flow rate and pressure ratio of the compressor increase. The compressor also traverses certain speed/flow regimes within which the fluid flow in flow path 32 tends to surge. Because the guide vanes are extended into the flow path 32 by the spring 78 during start-up, the swirl added to the fluid influences the compressor to substantially prevent surging. As the speed of the rotor increases, increasing fluid pressure acting upon piston 68 opposes the spring 78 to retract the guide vanes 58. The effective area of piston 68 and the preload and spring rate of spring 78 are selected so that when the compressor 10 reaches normal operating speed, the guide vanes are fully retracted (as illustrated by solid lines in FIG. 1). As a result, during normal speed operation of the compressor the flow path 32 is substantially unobstructed and fluid flows to the rotor 14 with minimal pressure drop.

Further, should the speed of the compressor decrease below normal operating speed so that the fluid pressure downstream of the rotor 14 decreases and surging is once again imminent, the spring 78 of actuator 64 moves the shroud 60 away from the wall 26 to extend the guide vanes 58 into the flow path 32. As a result, a portion of the fluid flowing to the rotor 14 is forced to flow between the guide vanes 58 and is swirled before passing to the rotor. Because the wall 26 leads to the radially outer or tip part of the impeller blades 56 where surging is first imminent, the tip part of the blades receive the swirling fluid portion to suppress surging. Of course, the remainder of the fluid flow, which does not pass between the guide vanes 58, follows the wall 28 to the radially inner part of the rotor 14. Thus, the shroud 60 and guide vanes 58 are axially movable to effect a radially variable swirling portion of the fluid flow.

Of course, it will be apparent to those skilled in the pertinent art that the operating scheme described above may be reversed. That is, the guide vanes 58 may be yieldably biased to a retracted position and the rotor 14 designed to traverse the lower speed/flow regimes without surging. As the rotor speed approaches the higher speed/flow regimes where surging is possible, the actuator 64 extends the guide vanes into the flow path 32. Swirl added to the fluid in this case increases the relative velocity and angle of attack of the blades 56 to allow the rotor 14 to reach full operating speed without surging. During full normal speed operation of the compressor, the inlet guide vanes 58 are extended to a determined position to add a selected swirl to the fluid flowing to the rotor 14.

FIG. 3 illustrates an alternative embodiment of the invention wherein reference numerals having a prime indicate features which are analogous in structure or function to those referenced in FIGS. 1 and 2 by the same numeral. The fluid compressor 10' illustrated in FIG. 3 differs from the compressor of FIGS. 1 and 2 in the configuration of the housing 12' and of rotor 14'. Rotor 14' is of mixed-flow, radial/axial type. In other words, the fluid flowing from the rotor 14' has both an axial and a radial velocity component (as illustrated by arrows G). Despite the design differences between the rotors 14 illustrated in FIGS. 1 and 3, swirling of the fluid flowing to the rotors influences their mass flow rate, pressure ratio, and surging characteristics in much the same way.

FIGS. 4, 5, and 6 illustrate yet another embodiment of the invention wherein reference numerals having a double prime indicate features which are analogous in structure or function to those features referenced supra by the same numeral. FIG. 4 fragmentarily illustrates a compressor 10'' having a housing 12'' defining a multitude of axially extending slots 62'' (only one of which is illustrated in FIG. 4). A multitude of guide vanes 58'' (only one of which is illustrated) are slidably received in the slots 62'' and are secured to an inlet shroud 60'' for movement therewith. The wall 26'' of the housing 12'' leads to the radially outer or tip part of the blades of an impeller (not shown).

Viewing FIG. 4, it will be seen that the guide vanes 58'' are tapered or decrease in cord dimension from their root end 80 to their tip end 82 adjacent the shroud 60''. Because the guide vanes 58'' are tapered and have a greater cord dimension adjacent the wall 26'', they impart a greater magnitude of swirl to the fluid flowing adjacent the wall 26'' than to the fluid adjacent the shroud 60''.

It is believed that during operation of a compressor when surging fluid flow is imminent a region of possible surging flow originates at the tip part of the impeller blades and grows radially inwardly as surging becomes more immediate. Surging flow, it is believed, then originates at the tip part of the impeller blades and grows radially inwardly in the region of possible surging flow. Therefore, the swirling fluid flowing to the impeller from the tapered vanes 58'' is particularly appropriate to suppress surging flow because the fluid has a greater swirl magnitude adjacent the wall 26'' leading to the tip part of the impeller blades where the potential for surging is strongest. Further, the magnitude of the swirl decreases with decreasing impeller radius; as does the potential for surging flow.

In addition to the radially varying magnitude of swirl imparted to the fluid by the tapered guide vanes 58'', the shroud 60'' and guide vanes 58'' are movable axially to effect a radially variable portion of swirling fluid flow to the impeller of the compressor.

An advantage of the tapered guide vanes 58'' is that they present a minimal surface area to the fluid flowing in the the inlet 30 so that pressure losses due to viscosity and friction are minimized. In other words, the tapered guid( vanes 58" are capable of providing sufficient swirl to suppress fluid surging while at the same time creating a minimal obstruction and pressure drop in the :nlet 30".

FIGS. 5 and 6 illustrate that the tapered guide vanes may also be aerodynamically twisted even though they are geometrically straight and span-wise slidable into a closely fitting slot. In order to accomplish an aerodynamic twisting of the guide vanes, the guide vanes may first be made with a constant cord dimension D, as is illustrated by dashed lines viewing FIGS. 4–6. A selected portion 84 of the trailing edge of the vane is trimmed off leaving a surface 86 intersecting with a pressure surface 88 of the vane to define an edge 90. The edge 90 becomes the new trailing edge of the vane. While the surface 86 and edge 90 are illustrated as flat cord-wise and straight span-wise, respectively, such need not be the case. However, the surface 86 should blend as smoothly as possible with a suction surface 92 of the vane. Because the guide vane is cambered and the cord dimension of the tapered vane decreases along the span of the blade, the trailing edge line C of the vane changes angular orientation along the span of the vane. A comparison of FIGS. 5 and 6 with FIG. 2 will show that the tapered and aerodynamically twisted vanes define an angle $\theta$ decreasing from the root end of the vane toward the tip end. Thus, the tapered and twisted vanes are believed to combine the advantage of minimizing the exposed blade surface area with minimum choking of the fluid flow through the guide vanes.

FIG. 7 diagrammatically illustrates a ground vehicle 94 having a drive axle 96 which journals a pair of ground-engaging traction wheels 98. A drive shaft 100 connects a combustion turbine engine 102 to the drive axle 96 in order to motively power the vehicle 94. The engine 102 is similar to that disclosed in U.S. Pat. No. 4,274,253, the disclosure of which is incorporated herein by reference to the extent necessary for a complete understanding of this invention. The engine 102 has an air intake housing 104 receiving filtered air therein. An intake 106 of the engine communicates with the interior of the intake housing 104. In order to obtain reference numerals for use in FIG. 7, features which are analogous in structure or function to those features illustrated and described supra are referenced with the numeral used previously and having a triple prime added. In order to more clearly show the intake shroud 60''' and guide vanes 58''', a portion of the engine (which also includes structure analogous to the portion 18 illustrated in FIG. 1) has been removed from the engine 102. Downstream of the intake 106, the engine includes a radial-flow or mixed-flow centrifugal compressor (not shown). Actuators 64''' move the shroud 60''' axially to move the guide vanes 58''' in and out of the inlet 106. Thus, the guide vanes 58''' are movable into the inlet 106 to suppress fluid surging during start-up and transient operating conditions of the engine 102. Further, during start-and-stop operation of the vehicle 94, the guide vanes 58''' are movable into the inlet to reduce the mass air flow rate through the engine 102 to reduce its power output. Because the mass air flow rate through the compressor of the engine 102 is reduced when the guide vanes 58''' are extended into the inlet, the speed of the compressor may be maintained at a relatively high level with little power requirement. Consequently, when an increased power output is desired from the engine 102, the actuators retract the guide vanes 58''' to rapidly increase the air mass flow rate and power output without the need to overcome the rotational inertia of the engine.

It is apparent in light of the above that this invention provides a method of operating and controlling a fluid compressor and turbine engine as well as fluid compressor and turbine engine apparatus.

I claim:

1. A fluid compressor comprising, a housing defining a fluid flow path therewithin and an inlet and outlet providing for fluid flow through said housing via said flow path, said housing journaling a rotor therewithin rotation of which moves fluid from said inlet to said outlet, and means upstream of said rotor with respect to fluid flow through said housing for selectively imparting a tangential velocity to said fluid flow with respect to the rotational axis of said rotor, said means for imparting tangential velocity to said fluid flow including a multitude of guide vanes movable into said fluid flow, said guide vanes being secured to and moving with an annular inlet shroud, said inlet shroud being movable within said flow path.

2. A fluid compressor comprising, a housing defining a fluid flow path therewithin and an inlet and outlet providing for fluid flow through said housing via said flow path, said housing journaling a rotor therewithin rotation of which moves fluid from said inlet to said outlet, and means upstream of said rotor with respect to fluid flow through said housing for selectively imparting a tangential velocity to said fluid flow with respect to the rotational axis of said rotor, said means for imparting tangential velocity to said fluid flow including a multitude of guide vanes movable into said fluid flow, said guide vanes being movable out of said fluid flow, said multitude of guide vanes being arranged annularly around said flow path when withdrawn from said fluid flow.

3. The invention of claim 2 wherein said guide vanes are movable axially into and out of said fluid flow.

4. The invention of claim 2 wherein said fluid compressor further includes a pressure-responsive actuator moving said guide vanes in response to fluid pressure downstream of said rotor.

5. The invention of claim 4 wherein said actuator includes a piston exposed to fluid pressure downstream of said impeller to bias said guide vanes in a direction moving the latter out of said fluid flow, said actuator also including resilient means for yieldably biasing said guide vanes in the opposite direction.

6. The invention of claim 2 wherein said guide vanes individually are tapered along their length.

7. The invention of claim 2 wherein said guide vanes individually are twisted along their length.

8. A fluid compressor comprising, a housing defining a fluid flow path therewithin, said housing defining an inlet and an outlet providing for fluid flow through said housing via said flow path, a compressor rotor journaled within said housing for rotation about an axis, and swirling means upstream of said rotor with respect to fluid flow through said housing for imparting a tangential velocity to said fluid flow with respect to said rotor axis, said swirling means including dividing means for selectively dividing said flow path upstream of said rotor into a first portion and a second portion, said dividing means directing one of said first and second portions through a multitude of guide vanes, said guide vanes imparting a tangential velocity to said one portion of said fluid flow, said dividing means comprising an inlet shroud movably carried by said housing, said inlet shroud in a first position cooperating with said housing to prevent fluid flow through said guide vanes, said inlet shroud moving to a second position to divide said flow path into said first and second portions.

9. The invention of claim 8 wherein said inlet shroud is movable within said flow path, said inlet shroud in said first position engaging said housing to bound said flow path, and said inlet shroud in said second position being spaced from said housing.

10. The invention of claim 9 wherein said inlet shroud is annular, said guide vanes being secured to and moving with said inlet shroud.

11. The invention of claim 8 or 10 wherein said guide vanes are annularly disposed, said guide vanes circumscribing said flow path when said inlet shroud is in said first position.

12. The invention of claim 11 wherein at least a portion of each one of said multitude of guide vanes is disposed in said flow path when said inlet shroud is in said second position.

13. The invention of claim 8 wherein said inlet shroud is movable axially between said first and second positions.

14. The invention of claim 10 wherein said housing defines a multitude of recesses movably receiving said multitude of guide vanes.

15. The invention of claim 8 wherein said guide vanes are tapered along their length.

16. The invention of claim 8 wherein said guide vanes are twisted along their length.

17. Fluid compressor apparatus comprising a housing, said housing defining a pair of axially and radially spaced walls defining an annular fluid inlet therebetween, said pair of walls further defining an annular fluid flow path extending radially inwardly from said inlet and axially to a compressor impeller, rotation of said compressor impeller inducting fluid through said inlet, said housing defining a multitude of annularly arranged circumferentially spaced and axially extending slots opening axially to said flow path on one of said pair of walls, each one of said multitude of slots movably receiving a respective one of a multitude of axially elongate guide vanes, said multitude of guide vanes each coupling at one end thereof to an axially movable inlet shroud which is movable in said flow path, said inlet shroud moving between a first position spaced from said one wall and a second position adjacent said one wall, said multitude of guide vanes moving axially with said inlet shroud and extending into said flow path in said first position of said inlet shroud to impart a tangential velocity to said fluid, said guide vanes moving out of said flow path in said second position of said inlet shroud.

* * * * *